Feb. 8, 1949.　　　　　D. E. MEITZLER　　　　　2,461,225
　　　　　　　　CONSTANT STROKE MECHANISM FOR
　　　　　　　　　FREE-PISTON COMPRESSORS
Filed Jan. 29, 1946　　　　　　　　　　　　　3 Sheets-Sheet 1

INVENTOR
DONALD E. MEITZLER

Charles A. Warren
ATTORNEY

INVENTOR
DONALD E. MEITZLER

ATTORNEY

Feb. 8, 1949.　　　　D. E. MEITZLER　　　　2,461,225
CONSTANT STROKE MECHANISM FOR
FREE-PISTON COMPRESSORS
Filed Jan. 29, 1946　　　　　　　　　　3 Sheets-Sheet 3
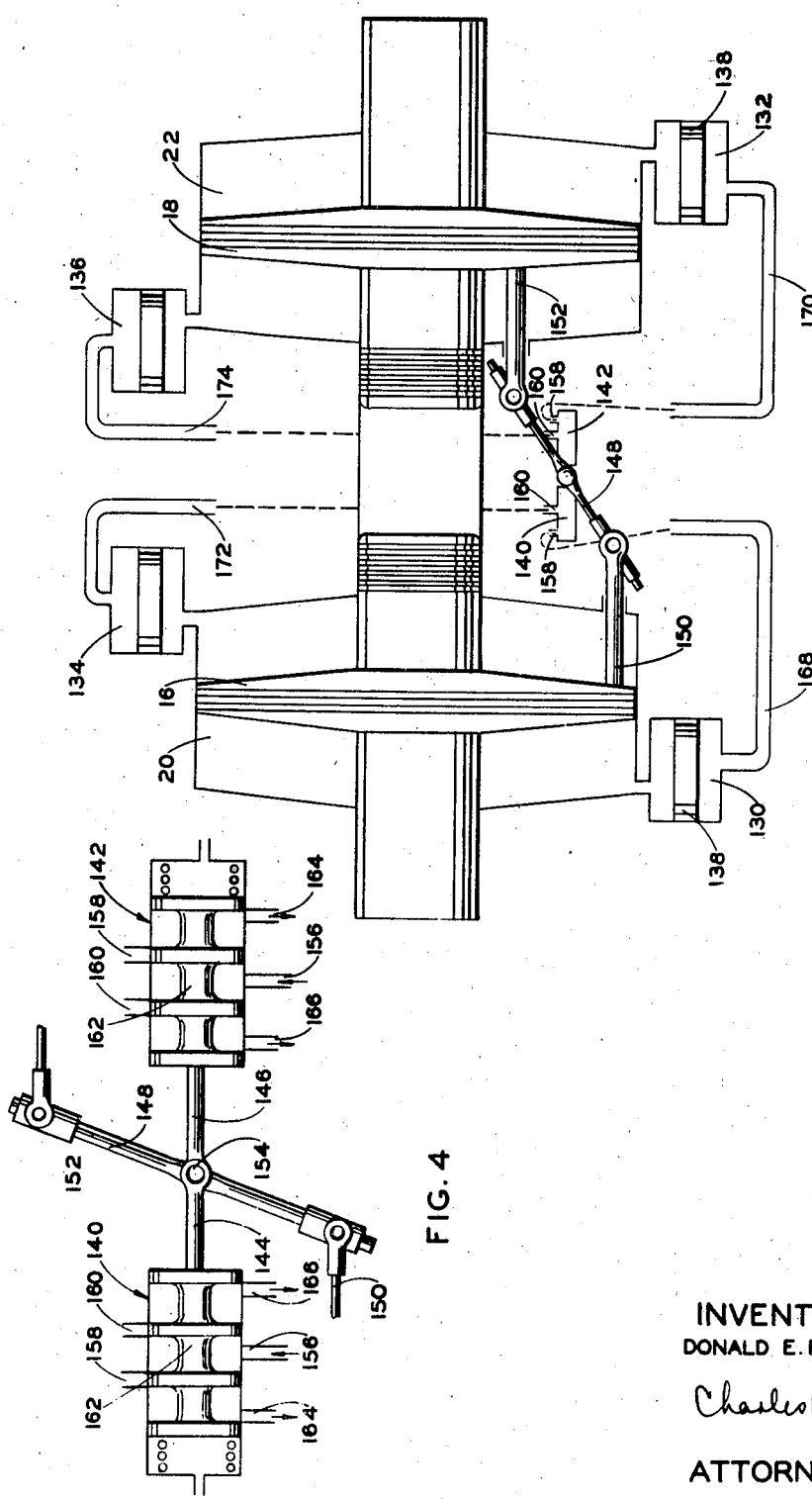
INVENTOR
DONALD E. MEITZLER
Charles A. Warren
ATTORNEY Patented Feb. 8, 1949

2,461,225

UNITED STATES PATENT OFFICE 2,461,225

CONSTANT STROKE MECHANISM FOR FREE-PISTON COMPRESSORS

Donald E. Meitzler, Manchester, Conn., assignor to United Aircraft Corporation, East Hartford, Conn., a corporation of Delaware Application January 29, 1946, Serial No. 644,091

9 Claims. (Cl. 230—56)

This invention relates to free-piston units in which the control of the unit is obtained by changing the residual volume in the compressor. The length of stroke of the reciprocating piston assembly in a free-piston generator is affected by the load on the compressor and by other factors including the quantity of fuel injected, the pressure in the air spring and the intake and discharge pressures of the air in the compressor cylinders. Unless the generator operates under substantially constant conditions at all times controls become necessary to maintain the length of the piston stroke within predetermined limits and also to maintain the position of the stroke such that the scavenge and exhaust ports of the engine cylinder may be uncovered during each piston stroke so that scavenging of the engine cylinder is possible. A feature of this invention is the control of the piston stroke by adjusting the residual volume of the compressor cylinder.

Another feature is the maintenance of the pistons in symmetry with respect to the center line of the engine cylinder by adjustment of the residual volume of the compressor.

Gas remaining at the ends of the compressor cylinder at the end of the piston stroke aids the air spring in moving the piston in the opposite direction and the effectiveness of this assistance may be adjusted by the quantity of gas compressed within the compressor cylinder. It is possible to adjust the residual volume of the compressed gas by providing an adjustable clearance space communicating with the compressor cylinder. A feature of this invention is a control of the clearance volume by the piston stroke.

Other objects and advantages will be apparent from the specification and claims, and from the accompanying drawings which illustrate an embodiment of the invention.

Fig. 3 shows diagrammatically a synchronizing device.

Fig. 4 is a sectional view through the valves of Fig. 3.

Figure 1:
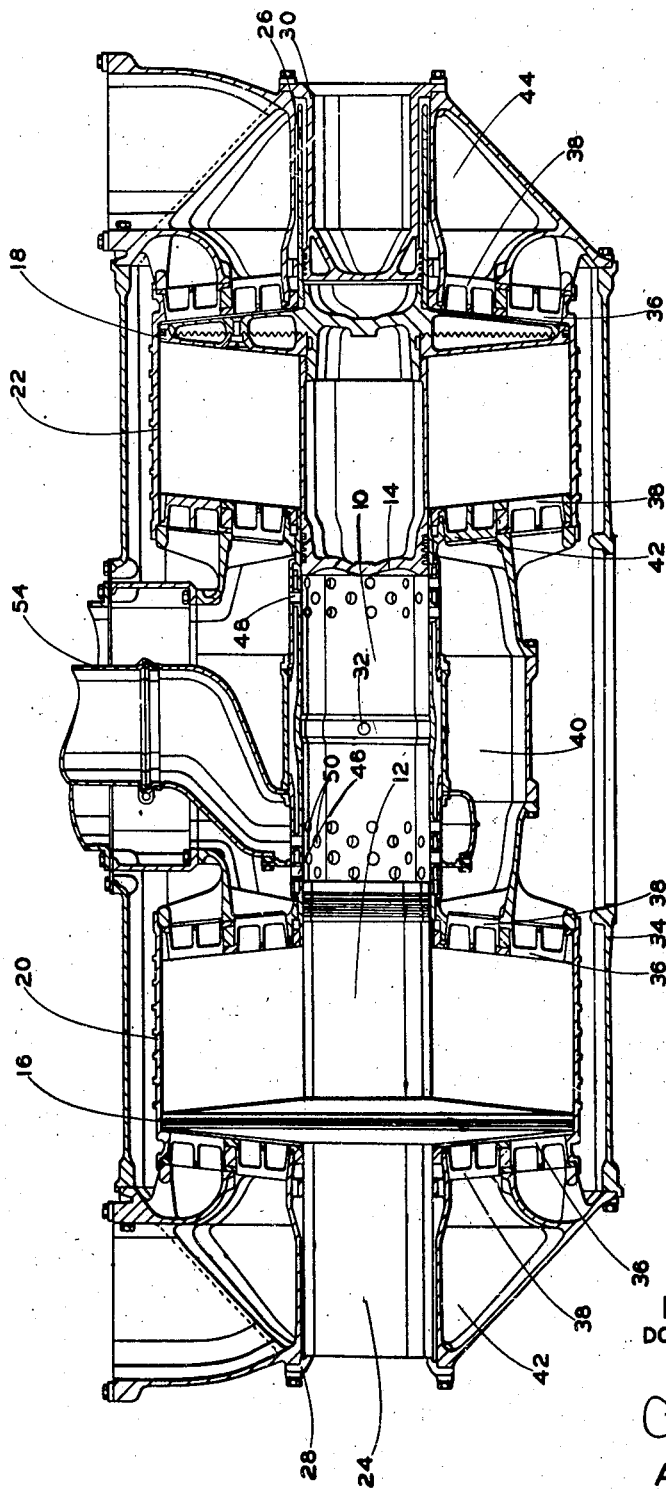
Fig. 1 is a sectional view through the free-piston unit.

The unit shown includes an engine cylinder 10 having reciprocating pistons 12 and 14 to which compressor pistons 16 and 18 in cylinders 20 and 22 are integrally connected. Sleeves 24 and 26 attached to the compressor pistons complete the reciprocating piston assemblies. The sleeves reciprocate over stationary pistons 28 and 30 and form air spring cylinders.

The piston assemblies are moved apart by the burning of fuel injected into engine cylinder 10 by one or more nozzles 32. Air compressed in the air spring cylinders on the power stroke return the piston assemblies. The piston assemblies may be maintained always at equal distances from the center of the engine cylinder by a mechanism hereinafter described.

Intake manifold 34, which extends around the cylinders, conducts air to intake valves 36 in the heads of the compressor cylinders, through which air alternately enters opposite ends of the compressor cylinders. The compressed air leaves the cylinders through discharge valve 38, also at opposite ends of the compressor cylinders and passes into a central scavenge chamber 40 and end chambers 42 and 44. These chambers may be connected by a manifold, not shown.

Compressed air from the chambers enters the engine cylinder through ports 46 and 48 which are uncovered by the pistons 12 and 14 at the end of the power stroke, thereby permitting air to be blown through the engine cylinder. Gas in the engine cylinder discharges through exhaust ports 50 into exhaust manifold 54. The compressors shown are double-acting and pump gas on each stroke.

The compressor cylinders have devices by which the clearance or residual volume may be adjusted. As shown in connection with cylinder 22, a small chamber 56, having a floating piston or partition 58 is connected with the inner end of cylinder 22. A similar chamber 60 having a floating partition 62 communicates with the outer end of cylinder 22. The partitions divide the chambers into two parts, one of which is in communication with the compressor cylinder. As the pistons 58 and 62 move upwardly the clearance volume at opposite ends of the compressor cylinder is increased and, similarly downward movement of the pistons decreases the clearance volume.

Figure 2:
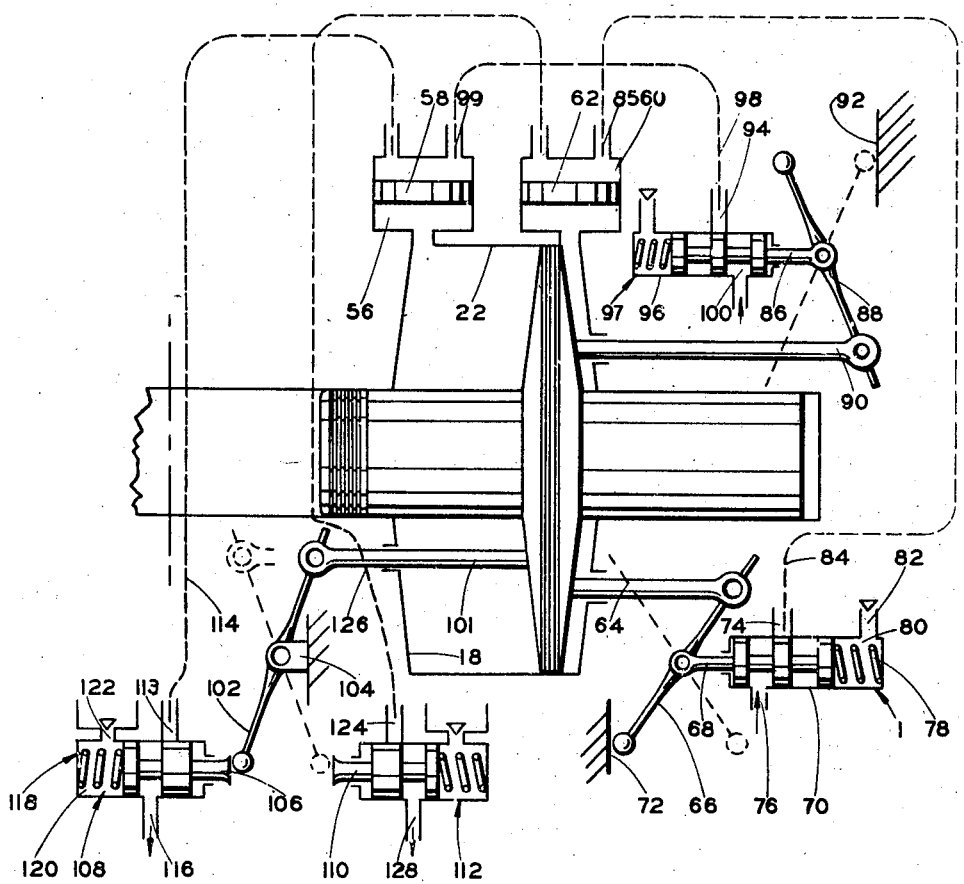
Fig. 2 is a diagrammatic view showing the devices for controlling the residual volume and the linkages associated with the piston for adjusting residual volume.

The position of the pistons 58 and 62 may be adjusted by applying fluid pressure to the upper sides of the piston, this pressure being controlled in response to the piston movement. As shown in Fig. 2, the piston assembly has a projecting rod 64 to the outer end of which a lever 66 is connected. The lever is pivoted on the projecting end of a valve plunger 68 in a casing 70 of a control valve 71 and the free end of the lever is in a position to engage a stationary surface 72 when the piston assembly reaches its normal outer end position.

Plunger 68 is normally in the position shown in which the outlet port 74 is out of fluid communication with the inlet port 76. A coil spring 78 holds the valve resiliently in the position shown and a dashpot in the form of a chamber 80 at the end of the plunger vented through a throttled opening 82 controls the rate of travel of the plunger.

Port 74 is connected by a duct 84 to a port 85 in the part of chamber 60 which is not in connection with the compressor cylinder. Thus, if the piston assembly moves beyond the normal outer end position of the stroke during its reciprocation the plunger 68 admits fluid to chamber 60 for reducing the clearance volume in the outer end of the compressor cylinder.

If the piston assembly moves on its inward stroke beyond the normal inner end position, the residual or clearance volume of chamber 56 is reduced through the action of a valve plunger 86 similar to plunger 68. On the end of plunger 86 is pivoted a lever 88 connected at one end to a rod 90 projecting from the piston assembly and engaging at its opposite end with a stationary surface 92 when the piston assembly reaches its normal inner end position. The outlet port 94 for the casing 96 of control valve 97, in which plunger 86 is slidable, is connected by conduit 98 to a port 99 to the part of the chamber 58 that is not in communication with the compressor cylinder. Fluid under pressure is admitted to casing 96 through a port 100 normally out of communication with port 94. If the piston assembly moves beyond its normal inner end of stroke, plunger 86 is moved to the left to connect these ports.

In addition to the overstroke valves which prevent an excessive length of stroke either at the outer or inner end of the stroke there may be understroke valves to prevent excessive shortening of the stroke. To this end a rod 101 on the piston assembly is connected to a lever 102 pivoted between its ends on a fixed support 104. The free end of the lever is in a position to engage with the plunger 106 of a valve 108 adjacent the inner end of the stroke of the piston assembly or with the plunger 110 of a valve 112 as the piston assembly approaches the outer end of its stroke.

Plunger 106 normally prevents fluid connection between a port 113, connected by a conduit 114 to chamber 56 and a discharge port 116. As the assembly reciprocates the lever 102 moves the plunger 106 to or beyond the position shown in which the port 112 is closed. A spring 118 normally moves plunger 106 into a position to open port 112 and the rate of travel of the plunger is controlled by a dashpot including a chamber 120 at the end of the plunger having a throttled outlet 122.

So long as the piston assembly moves to the normal outer end of its stroke the lever 102 on each oscillation will engage and move the plunger 106 to the left to or slightly beyond the position shown so that the port 112 stays covered. If the stroke shortens, however, lever 102 does not engage plunger 106 so that spring 118 moves the plunger to the left beyond the position shown, thereby venting chamber 56 for increasing the residual volume at the inner end of the compressor cylinder.

Plunger 110 is actuated in a similar way at the outer end of the reciprocating stroke of the piston assemblies so that if the piston assemblies do not move quite to the normal outer end position plunger 110 will establish fluid connection between port 124 which is connected by conduit 126 to chamber 60 and a vent port 128.

In this way, valves 71 and 97 prevent excessively long piston strokes by decreasing the residual volume at opposite ends of the compressor cylinder and valves 108 and 112 prevent excessive shortening of the stroke by increasing the residual volume. It will be apparent that an increase in residual volume tends to increase the length of the stroke of the piston assembly. Conversely, decreasing the residual volume tends to shorten the stroke, assuming that the same energy is supplied to the unit on each cycle.

It will be understood that chambers corresponding to chambers 56 and 60 will be provided on the other compressor cylinder in order that corresponding changes in residual volumes will occur simultaneously on both compressor cylinders. The control valves may operate through hydraulic relays, instead of directly, as shown.

The change in residual volume at opposite ends of the compressor cylinder may be used not only for shortening or lengthening the piston stroke. Such a change in residual volume may also be used for causing the piston assemblies to move symmetrically. As shown in Fig. 3 the compressor cylinders 20 and 22 may have chambers 130 and 132 at the outer ends and chambers 134 and 136 at the inner ends. The chambers have floating partitions 138 dividing each of the chambers into two parts, one of which communicates with the compressor cylinder, the other of which receives fluid under pressure for moving the partition and thereby adjusting the residual volume of the compressor cylinders.

For controlling the supply of fluid under pressure, control valves 140 and 142 having plungers 144 and 146 are arranged to be moved if the piston assemblies move unsymmetrically. As shown, plungers 144 and 146 are connected to an oscillating rod 148, the ends of which are connected to projecting rods 150 and 152 on the pistons 16 and 18. If the piston assemblies move symmetrically the pivot point 154 for the lever 148 remains stationary. If one of the pistons moves unsymmetrically with respect to the other the pivot point 154 will move laterally and move plungers 144 and 146 for admitting fluid to certain of the chambers and venting the other chambers. The valves are similar and each has an inlet port 156 and spaced outlet ports 158 and 160 to which fluid is alternately admitted by a groove 162 in the plunger. Spaced vent ports 164 and 166 permit discharge of fluid from the other of the outlet ports when one of them is connected to inlet port 156. Port 158 for valve 140 is connected by conduit 168 to chamber 130 and the corresponding port 158 of valve 142 is connected by conduit 170 to chamber 132. Ports 160 and 160' are connected respectively to chambers 134 and 136 by conduits 172 and 174.

Assuming that piston 16 moves inwardly more rapidly than piston 18 the pivot point 154 will be moved to the right, thereby admitting fluid through port 158 of valve 142 to chamber 132 and through port 160 of valve 140 to chamber 134 and the venting chambers 130 and 136. Thus, the residual volumes at the inner end of cylinder 20 and at the outer end of cylinder 22 will be decreased and the residual volumes at the outer end of cylinder 20 and inner end of cylinder 22 will be increased. The increase in residual volume at the outer end of cylinder 20 causes the outward stroke of the piston 16 to lengthen on the next outward stroke of the piston assemblies, thereby slowing the frequency of the piston assembly 16 down until it matches the frequency of the other piston assembly. Similarly, decreasing the residual volume in the inner end of cylinder 20 will cause the inward stroke to shorten.

It will be understood that the same arrangement can be made to work with a single-acting free-piston unit in which the chambers 134 and 136 are no longer used, and the control is affected by adjusting the volumes in chambers 130 and 132.

The arrangement shown provides a relatively light weight synchronizing linkage which does not transmit any substantial load between the piston assemblies. Thus, only one linkage may be required and the pistons will not require reinforcement to withstand the bending stresses resulting from purely mechanical restraining devices.

Although the structures of Figs. 2 and 3 are shown as separate devices it will be understood that the stroke controlling structure of Fig. 2 may be incorporated with the synchronizing mechanism of Fig. 3 in providing a complete control over the reciprocating motions of the piston assemblies.

It is to be understood that the invention is not limited to the specific embodiment herein illustrated and described, but may be used in other ways without departure from its spirit as defined by the following claims.

I claim:

1. In a free-piston unit, opposed piston assemblies each including an engine portion and a compressor portion, an engine cylinder in which the engine portions of the opposed assemblies reciprocate, compressor cylinders in which the compressor portions reciprocate, a chamber communicating with each of the inner and outer ends of each compressor cylinder, a control piston movable in each chamber for adjusting the volume of the chamber and thus controlling the clearance volume in the compressor cylinders, a source of control fluid, a control valve for controlling the flow of fluid from said source into and out of the chambers on the side of the piston opposite to its connection with the compressor cylinders, and means responsive to movement of one of said piston assemblies for adjusting said valve.

2. In a free-piston unit, opposed piston assemblies each including an engine portion and a compressor portion, an engine cylinder in which the engine portions of the opposed assemblies reciprocate, compressor cylinders in which the compressor portions reciprocate, a chamber communicating with each end of each compressor cylinder, a piston movable in each chamber and dividing each chamber into two parts one of which communicates with the compressor cylinder, a source of control fluid control valves connected to the other part of each chamber and responsive to movement of the piston assemblies for controlling the admission of fluid from said source to said chambers, thereby moving the piston and adjusting the volume of the parts of the chambers connected with the cylinders.

3. In a free-piston unit, opposed piston assemblies each including an engine portion and a compressor portion, an engine cylinder in which the engine portions of the opposed assemblies reciprocate, compressor cylinders in which the compressor portions reciprocate, a chamber connected with the outer end of each compressor cylinder, a movable partition in each chamber dividing it into two parts one of which communicates with the compressor cylinder, means for supplying fluid to the other part of each chamber for moving the partition and thus changing the volume in the part of the chamber communicating with the compressor cylinder, a control valve associated with said supplying means and means interconnecting one of said piston assemblies and the valve for moving said valve in response to movement of said piston for adjusting the supply of fluid to said other parts of the chambers.

4. In a free-piston unit, opposed piston assemblies each including an engine portion and a compressor portion, an engine cylinder in which the engine portions of the opposed assemblies reciprocate, compressor cylinders in which the compressor portions reciprocate, a chamber connected with the outer end of each compressor cylinder, a movable partition in each chamber dividing it into two parts one of which communicates with the compressor cylinder, means for supplying fluid to the other part of each chamber for moving the partition and thus changing the volume in the part of the chamber communicating with the compressor cylinder, and a control valve associated with said means, means interconnecting said piston assemblies including rods extending from the piston assemblies, and a connection between the rods and connected with a control valve, whereby the valve is moved by a non-symmetrical movement of the piston assemblies.

5. In a free-piston unit, a piston assembly including an engine portion and a compressor portion, an engine cylinder in which the engine portion reciprocates, a chamber communicating with one end of the compressor cylinder, a movable partition in said chamber dividing the chamber into two parts, one of which communicates with the compressor cylinder, a source of control fluid, a control valve for adjusting the supply of control fluid from the source to the other part of said chamber for moving the partition, and means responsive to a movement of the piston assembly beyond its normal position for rendering said control valve operative.

6. In a free-piston unit, a piston assembly including an engine portion and a compressor portion, an engine cylinder in which the engine portion reciprocates, a chamber communicating with one end of the compressor cylinder, a movable partition in said chamber dividing the chamber into two parts, one of which communicates with the compressor cylinder, a source of control fluid, a control valve for adjusting the supply of control fluid from the source to the other part of said chamber for moving the partition, and means responsive to a change in the end position of the piston stroke from the normal end of the stroke for rendering the control valve operative.

7. In a free-piston unit, opposed piston assemblies each including an engine portion and a compressor portion, an engine cylinder in which the engine portions of the opposed assemblies reciprocate, compressor cylinders in which the compressor portions reciprocate, a chamber communicating with the outer end of each compressor cylinder, a control piston movable in each chamber for adjusting the volume of the part of the chamber that connects with the compressor cylinder, and means mechanically connected to and movable with one of said piston assemblies and responsive to movement of said one of the piston assemblies, and means responsive to movement of said last means for moving said control piston.

8. In a free-piston unit, opposed piston assemblies each including an engine portion and a compressor portion, an engine cylinder in which the engine portions of the opposed assemblies reciprocate, compressor cylinders in which the compressor portions reciprocate, a chamber connected with the outer end of each compressor cylinder, a partition in each chamber dividing it into two parts one of which communicates with the compressor cylinder, said partition being movable in said chamber for adjusting the size of the part of the chamber communicating with the compressor cylinder, a source of control fluid, means for admitting control fluid from the source to the other part of each chamber for moving the partition and thereby changing the volume of the part of the chamber communicating with the compressor cylinder, and means mechanically connected with one of the piston assemblies and responsive to a change in the end position of the piston stroke for adjusting said fluid admitting means.

9. In a free-piston unit, a piston assembly including an engine portion and a compressor portion, an engine cylinder in which the engine portion reciprocates, and a compressor cylinder in which the compressor portion reciprocates, means for adjusting the residual volume at least at one end of the compressor cylinder, means mechanically connected to and movable by said piston assembly, said means being actuated by said piston assembly, and means operated by said last means and responsive to a change in the end position of the piston stroke from the normal end position for actuating said adjusting means.

DONALD E. MEITZLER.

REFERENCES CITED

The following references are of record in the file of this patent:

UNITED STATES PATENTS

| Number | Name | Date |
|---|---|---|
| 1,588,256 | Metzgar | June 8, 1926 |
| 1,997,476 | Wallene | Apr. 9, 1935 |
| 2,038,442 | Pescara | Apr. 21, 1936 |
| 2,064,976 | Janicke | Dec. 22, 1936 |
| 2,086,162 | Janicke | July 6, 1937 |
| 2,090,709 | Steiner | Aug. 24, 1937 |
| 2,197,158 | Saharoff | Apr. 16, 1940 |